(No Model.)

J. H. DIGEON.
APPARATUS FOR PRODUCING AND WASHING CARBONIC ACID GAS.

No. 375,611. Patented Dec. 27, 1887.

Witnesses,
Geo. W. Rea
Robt. Garrett

Inventor,
Jules H. Digeon.
By James L. Norris
Atty.

N. PETERS, Photo-Lithographer, Washington, D. C.

UNITED STATES PATENT OFFICE.

JULES HENRI DIGEON, OF PARIS, FRANCE.

APPARATUS FOR PRODUCING AND WASHING CARBONIC-ACID GAS.

SPECIFICATION forming part of Letters Patent No. 375,611, dated December 27, 1887.

Application filed October 18, 1887. Serial No. 252,722. (No model.) Patented in France December 11, 1886, No. 180,222, and in Belgium December 15, 1886, No. 75,608.

*To all whom it may concern:*

Be it known that I, JULES HENRI DIGEON, a citizen of France, residing at 56 Rue de Lancry, Paris, in the Republic of France, have invented a new and useful Apparatus for Producing and Washing Carbonic-Acid Gas, (for which I have obtained a patent in France, dated December 11, 1886, No. 180,222, and in Belgium dated December 15, 1886, No. 75,608,) of which the following is a specification.

My invention relates to apparatus for producing carbonic-acid gas and subjecting it to repeated washings, so that it can be delivered in suitable condition for aerating beverages.

Figure 2:
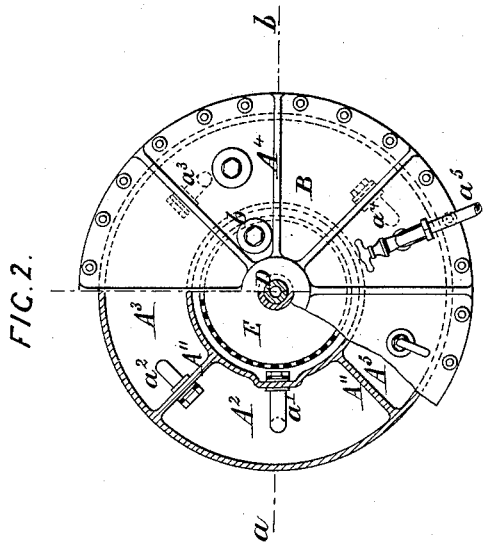
Figure 1:
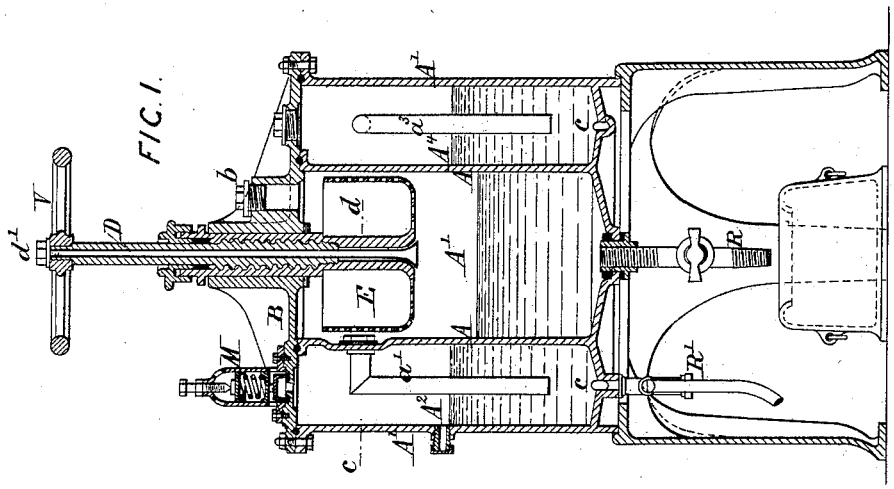

Figure 1 of the accompanying drawings is a vertical section on the line $a\,b$ of Fig. 2 of an apparatus according to my invention. Fig. 2 is a plan, partly in section, on the line $c\,d$ of Fig. 1.

A A' are two concentric cylinders forming an inner compartment, A, and an annular space around it. This annular space is divided by radial partitions A'' into a number of compartments—such as $A^2\,A^3$—which are charged about half-way up with water or other suitable washing-liquid, and which communicate with each other by a passage, $c$, at the bottom, this passage having an outlet pipe and cock, R', by opening which all the compartments can be emptied. From the upper part of the central compartment a bent pipe, $a'$, dips down into the liquid in the first compartment, $A^2$, from the upper part of $A^2$ a similar pipe, $a^2$, dips into the liquid in $A^3$, and so on, until finally from the last compartment, $A^5$, there is an outlet-pipe, $a^5$, provided with a cock or valve.

On the cover over one of the compartments is a spring safety-valve, M, the load on which can be adjusted by a screw to the desired pressure. The cover B is bolted on with packing, which makes tight joints over the flanges and partitions of the vessel.

Through packing in the center of the cover B passes a tubular screwed spindle, D, to the lower end of which is attached an open perforated vessel, E, which, by turning a hand-wheel, V, fixed on the screwed spindle D, can be raised or lowered. The central compartment, A, being charged to a certain depth with acid through the tubular spindle D, the bore of which is closed by a screw-cap, $d'$, and the vessel E being charged with carbonate through a hole in the cover which is closed by a screw-plug, $b$, the hand-wheel V is turned, so as to lower the carbonate in E more or less into the acid in A, causing evolution of carbonic-acid gas. The gas passes through the liquid in the successive compartments $A^2\,A^3$, &c., and thus becomes thoroughly washed before its delivery by the pipe $a^5$.

The central vessel, A, can be emptied by opening a cock or valve in a pipe, R, at the bottom.

Having thus described the nature of my invention and the best means I know of carrying it out in practice, I claim—

1. An apparatus for producing and washing carbonic-acid gas, consisting of an inner and an outer cylinder arranged to provide an intervening space and a central acid-compartment, a series of radial partitions dividing the said intervening space into a number of radial compartments to contain the washing-liquid, a pipe leading from the central acid-compartment into one of the radial compartments, and pipes secured to the radial partitions and successively placing said radial compartments in communication, substantially as described.

2. In apparatus for producing and washing carbonic-acid gas, having a central producing-compartment surrounded by successive washing-compartments, in combination with the central compartment and its cover, a perforated vessel containing carbonate attached to a screwed tubular spindle, substantially as and for the purpose herein set forth.

In testimony whereof I have signed my name to this specification, in the presence of two subscribing witnesses, this 5th day of October, A. D. 1887.

JULES HENRI DIGEON.

Witnesses:
 FERDINAND MOREL,
 GEORGES CARRÉ.